(12) United States Patent
Litwinowicz et al.

(10) Patent No.: US 9,132,911 B2
(45) Date of Patent: Sep. 15, 2015

(54) DAMAGE ADAPTIVE CONTROL

(71) Applicant: Sikorsky Aircraft Corporation, Stratford, CT (US)

(72) Inventors: Anthony Litwinowicz, Derby, CT (US); Vineet Sahasrabudhe, Cheshire, CT (US); Jonathan K. Garhart, Seymour, CT (US); Preston R. Bates, Fort Worth, TX (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 45 days.

(21) Appl. No.: 13/780,987

(22) Filed: Feb. 28, 2013

(65) Prior Publication Data

US 2014/0244075 A1   Aug. 28, 2014

(51) Int. Cl.
*B64C 19/00*   (2006.01)
*G05D 1/00*   (2006.01)

(52) U.S. Cl.
CPC .............. *B64C 19/00* (2013.01); *G05D 1/0055* (2013.01)

(58) Field of Classification Search
CPC ...................................................... B64C 19/00
USPC ............................................................ 701/3
See application file for complete search history.

(56) References Cited

U.S. PATENT DOCUMENTS

| | | | |
|---|---|---|---|
| 5,881,971 A | 3/1999 | Hickman | |
| 6,823,675 B2 | 11/2004 | Brunell et al. | |
| 6,860,712 B2 | 3/2005 | Pisano et al. | |
| 7,546,219 B2 | 6/2009 | Wilke et al. | |
| 7,568,662 B1 | 8/2009 | Conner | |
| 7,571,058 B2 | 8/2009 | Sealing et al. | |
| 2007/0265790 A1* | 11/2007 | Sealing et al. | 702/33 |
| 2011/0245999 A1* | 10/2011 | Kordonowy | 701/3 |
| 2012/0060505 A1 | 3/2012 | Fuller et al. | |

* cited by examiner

*Primary Examiner* — Mary Cheung
*Assistant Examiner* — Yuen Wong
(74) *Attorney, Agent, or Firm* — Cantor Colburn LLP

(57) ABSTRACT

Embodiments of the disclosure are directed to measuring, via at least one sensor, at least one of a damage and a compromise associated with a vehicle, determining at least one of a region and a location of the at least one of a damage and a compromise and a level of the at least one of a damage and a compromise, and adapting an operational envelope for the vehicle based on the determined at least one of a region and a location of the at least one of a damage and a compromise and the level of the at least one of a damage and a compromise.

13 Claims, 4 Drawing Sheets

DAMAGE ADAPTIVE CONTROL

BACKGROUND

When a component of an aircraft's structure (e.g., a rotorcraft, such as a helicopter, cyclocopter, autogyro, gyrodyne, etc.; a fixed-wing aircraft, such as an airplane, a seaplane, etc.) becomes damaged during flight, the aircraft may be landed and inspected to determine the extent of the damage and the cause of the damage. Methods are available for: (i) sensing that the aircraft, or a portion thereof, may be damaged, and (ii) providing or indicating maintenance actions that could be taken when the aircraft is landed. If a portion or component of the aircraft structure sustains damage during flight, and the pilot continues the flight (e.g., either to the scheduled destination or to a base), the damage may spread or propagate to one or more additional components of the aircraft structure, particularly if loads are not minimized in the proximity of the affected area.

BRIEF SUMMARY

An embodiment of the disclosure is directed to a method comprising: measuring, via at least one sensor, at least one of a damage and a compromise associated with a vehicle, determining at least one of a region and a location of the at least one of a damage and a compromise and a level of the at least one of a damage and a compromise, and adapting an operational envelope for the vehicle based on the determined at least one of a region and a location of the at least one of a damage and a compromise and the level of the at least one of a damage and a compromise.

An embodiment of the disclosure is directed to an apparatus comprising: at least one processor, and memory having instructions stored thereon that, when executed by at least one processor, cause the apparatus to: measure at least one of a damage and a compromise associated with a vehicle, determine at least one of a region and a location of the at least one of a damage and a compromise and a level of the at least one of a damage and a compromise, and adapt an operational envelope for the vehicle based on the determined at least one of a region and a location of the at least one of a damage and a compromise and the level of the at least one of a damage and a compromise.

An embodiment of the disclosure is directed to a system comprising: at least one sensor configured to provide data associated with an operation of an vehicle, and a control computer configured to receive the data and analyze the data to determine that a component associated with the vehicle structure is at least one of damaged and compromised, wherein the control computer is configured to adapt an operational envelope for the vehicle based on the determination.

An embodiment of the disclosure is directed to a vehicle comprising: a structure, at least one sensor configured to generate data pertaining to the structure, a computing system configured to receive the data, process the data, and generate a control output, and a propulsion and control surface configured to compensate for an inoperability in the structure based on the control output.

Additional embodiments are described below.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
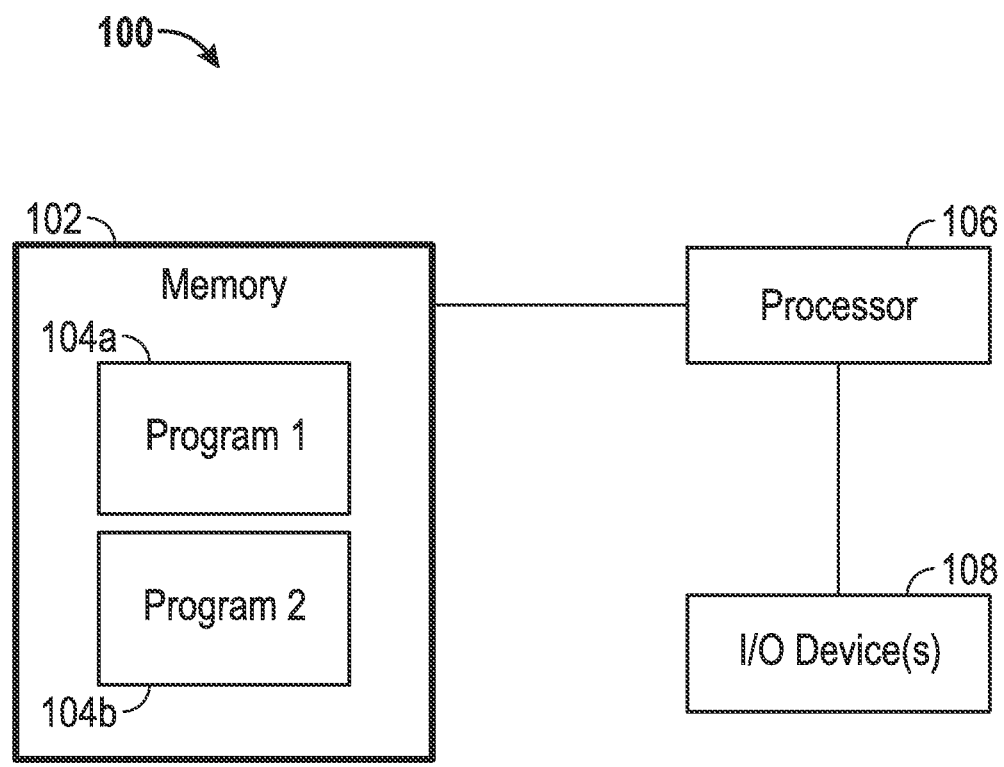
FIG. 1 is a schematic block diagram illustrating an exemplary computing system in accordance with one or more embodiments of this disclosure.

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect. In this respect, a coupling between entities may refer to either a direct or an indirect connection.

Exemplary embodiments of apparatuses, systems, and methods are described for adapting an operational envelope in response to one or more structural components of a vehicle becoming inoperable (e.g., damaged or compromised). In connection with an aircraft, such inoperability may occur when the aircraft is on the ground or during flight. In some embodiments, the inoperability may be a result of damage or compromise. In some embodiments, data from one or more sensors may be used to determine or identify a component that becomes damaged or compromised, a type of damage/comprise, and/or a level or an extent of the damage/compromise. Based on the damage/compromise, an operational envelope may be established or adjusted. The operational envelope may reduce the effective load on the vehicular structure or a component thereof. For example, a load may be reduced in proximity to a damaged or compromised component. The operational envelope may be selected to allow a user, such as a pilot, to continue to operate the vehicle. The operational envelope may be selected to reduce loads to achieve safe loads (e.g., flight loads in the case of an aircraft) with respect to a given component, or to minimize or eliminate propagation of the damage/compromise.

Referring to FIG. 1, an exemplary computing system 100 is shown. The system 100 is shown as including a memory 102. The memory 102 may store executable instructions. The executable instructions may be stored or organized in any manner and at any level of abstraction, such as in connection with one or more processes, routines, methods, etc. As an example, at least a portion of the instructions are shown in FIG. 1 as being associated with a first program 104*a* and a second program 104*b*.

The instructions stored in the memory 102 may be executed by one or more processors, such as a processor 106. The processor 106 may be coupled to one or more input/output (I/O) devices 108. In some embodiments, the I/O device(s) 108 may include one or more of a keyboard or keypad, a touchscreen or touch panel, a display screen, a microphone, a speaker, a mouse, a button, a remote control, a joystick, a printer, etc. The I/O device(s) 108 may be configured to provide an interface to allow a user to interact with the system 100.

The system 100 is illustrative. In some embodiments, one or more of the entities may be optional. In some embodiments, additional entities not shown may be included. For example, in some embodiments the system 100 may be associated with one or more networks. In some embodiments, the entities may be arranged or organized in a manner different from what is shown in FIG. 1. One or more of the entities shown in FIG. 1 may be associated with one or more of the devices or entities described herein.

Figure 2:
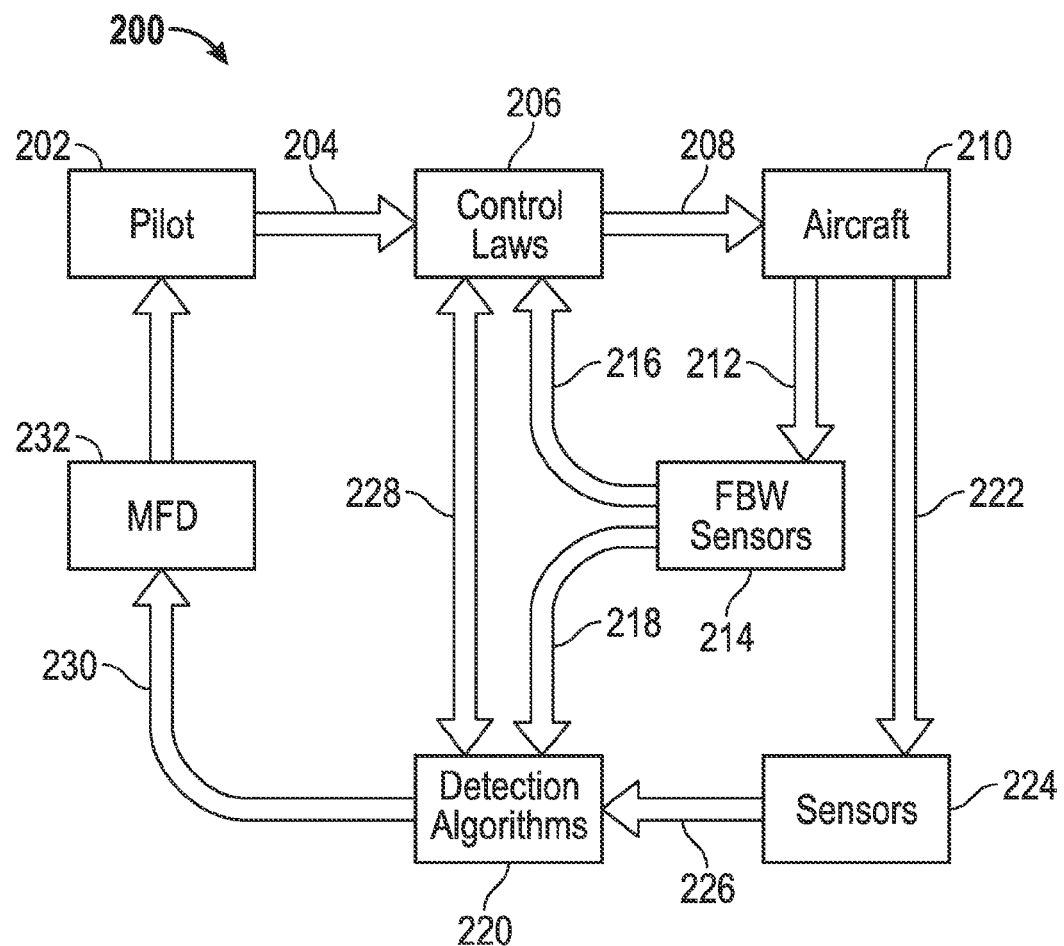
FIG. 2 illustrates a block diagram of a system for adaptive control of an aircraft in accordance with one or more embodiments of this disclosure.

FIG. 2 illustrates a block diagram 200 of a system for adaptive control of an aircraft in accordance with one or more embodiments. The block diagram 200 may be implemented by one or more systems, devices, or components, such as those described herein. For example, the block diagram 200 may be implemented in connection with the system 100 of FIG. 1.

As shown in FIG. 2, a user (e.g., a pilot 202) may issue one or more commands 204. The commands 204 may correspond to directives that the pilot 202 issues, which may represent a request to command a component or device of the aircraft to a particular state. The commands 204 may be generated in response to actuation or movement of a device located in a cockpit.

The commands 204 may be received by a control computer that may implement or run one or more control laws. The control computer/control laws 206 may provide controls 208 to an aircraft 210. The control computer/control laws 206, or the aircraft 210, may adhere to a fly-by-wire (FBW) configuration.

The controls 208 may regulate operation of one or more devices or components associated with the aircraft 210. For example, the controls 208 may regulate air speed, attitude, acceleration, etc., associated with the aircraft 210. The regulation provided by the controls 208 may establish or modify an envelope associated with the operation or flight of the aircraft 210.

Behavior or operation 212 of the aircraft 210 may be monitored. For example, such monitoring may occur via the use of, or by one or more, sensors 214. The sensors 214 may be configured to provide feedback 216 to the control computer/control laws 206 regarding the state of the aircraft 210. For example, the feedback 216 may include state data, such as acceleration, angular rates, attitudes, altitude, mass, fuel flow and other data associated with the aircraft 210. The sensors 214 may also provide the state data 218 to one or more detection algorithms 220.

Behavior or operation 222 of the aircraft 210 may be monitored by sensors 224. The sensors 224 may be configured to sense data that may be associated with an inoperability of a device or component of the aircraft 210. The data 226 may be provided by the sensors 224 to the detection algorithm(s) 220.

The detection algorithm(s) 220 may exist separate from other entities. In some embodiments, the detection algorithm(s) 220 may be combined with, or exist with, another entity, such as the control computer/control laws 206. The detection algorithm(s) 220 may be operative on the state data 218 and/or the data 226. The detection algorithm(s) 220 may determine or identify a component of the aircraft 210 that is inoperable, a region (e.g., a location) of the component, and a level of the inoperability. That determination/identification may be provided 228 to the control computer/control laws 206 for adjustment of the controls 208 in response thereto. The determination/identification may be provided 230 to an I/O device 108, such as a multi-function display (MFD) 232. The MFD 232 may be configured to display or play status or warning messages or instructions regarding the damage or compromise, which may be used by the pilot 202 to establish or adjust/modify the commands 204 in response thereto.

Figure 3:
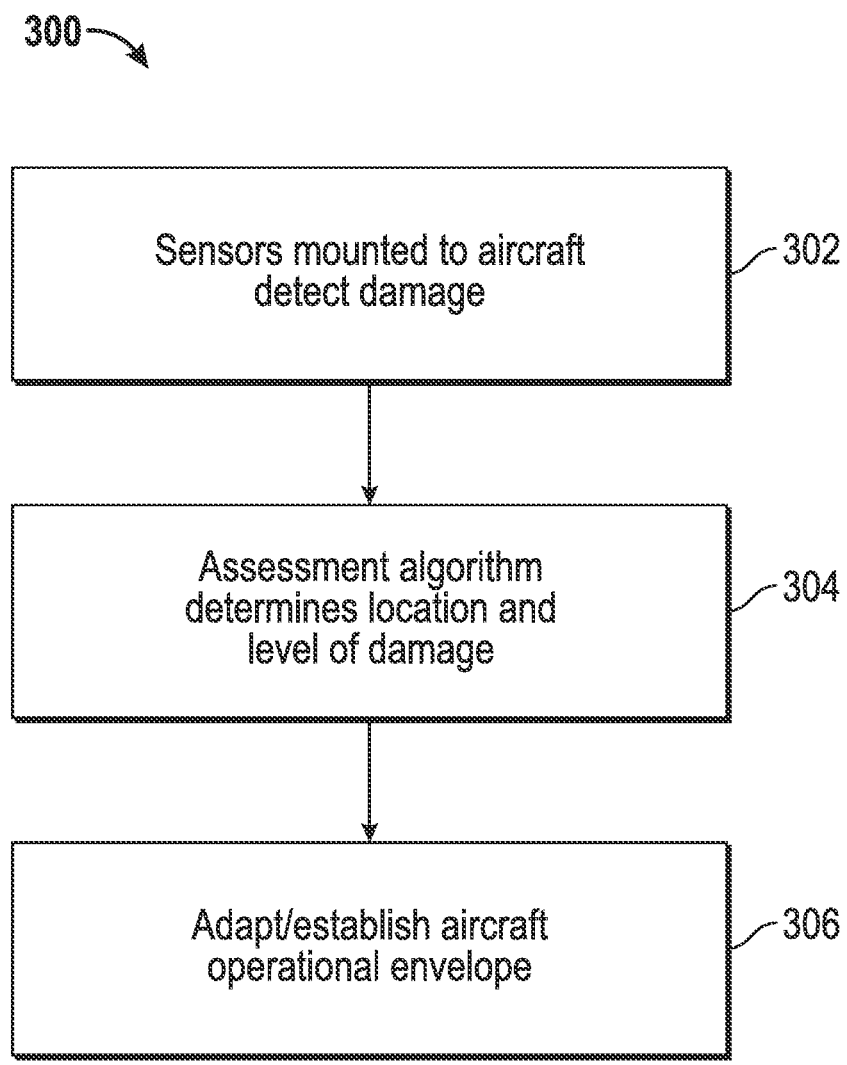
FIG. 3 is a flow chart of an exemplary method for adaptive control of an aircraft in accordance with one or more embodiments of this disclosure.

Turning to FIG. 3, a flow chart of a method 300 for adaptive control of an aircraft is shown. The method 300 may be executed in connection with one or more components, devices, or systems, such as those described herein. The method may be used to modify or establish an operational envelope.

In block 302, one or more sensors, potentially mounted to the aircraft, may measure damage or compromise to the aircraft structure. For example, the effect or impact may indicate that the damage or compromise may allow the aircraft to continue to be operated with a reduced envelope, or may indicate to, e.g., a pilot that the aircraft should be landed immediately.

In block 304, one or more algorithms may be invoked. The algorithm(s) may make an assessment of the region (e.g., the location) and level of damage or compromise, potentially based on the damage or compromise measured in block 302. Block 302 may be implemented, for example, by the detection algorithms 220 of FIG. 2. As part of block 304, a determination or identification of one or more components' damage or comprise location and level may be provided. The type of damage/compromise and/or an extent of damage/compromise may be provided as part of block 304. For example, such information may be provided on an output device (e.g., a display screen, a speaker, etc.).

In block 306, an aircraft operational envelope may be adapted or established, potentially based on the invocation of the algorithm(s) of block 304. In some embodiments, the operational envelope of block 306 may be based on one or more control laws. The operational envelope may serve to reduce a load imposed on the damaged or compromised aircraft component by adjusting, for example, control computer/control laws 206. Such load reduction may be used to compensate for the damage or compromise. The operational envelope may set the outer boundaries or thresholds within which the aircraft is allowed to operate, which may be less than the actual operational capabilities of the aircraft.

The operational envelope of block 306 may serve to limit one or more commands (e.g., commands 204) issued by a pilot, at least to an extent that the commands direct an operation of the aircraft that exceeds the operational envelope. In this manner, the pilot may be prohibited from commanding a state of operation that exceeds a safe or reliable operation threshold.

In some embodiments, one or more of the blocks or operations (or a portion thereof) of the method 300 may be optional. In some embodiments, the blocks may execute in an order or sequence different from what is shown in FIG. 3. In some embodiments, one or more additional blocks or operations not shown may be included.

Figure 4:
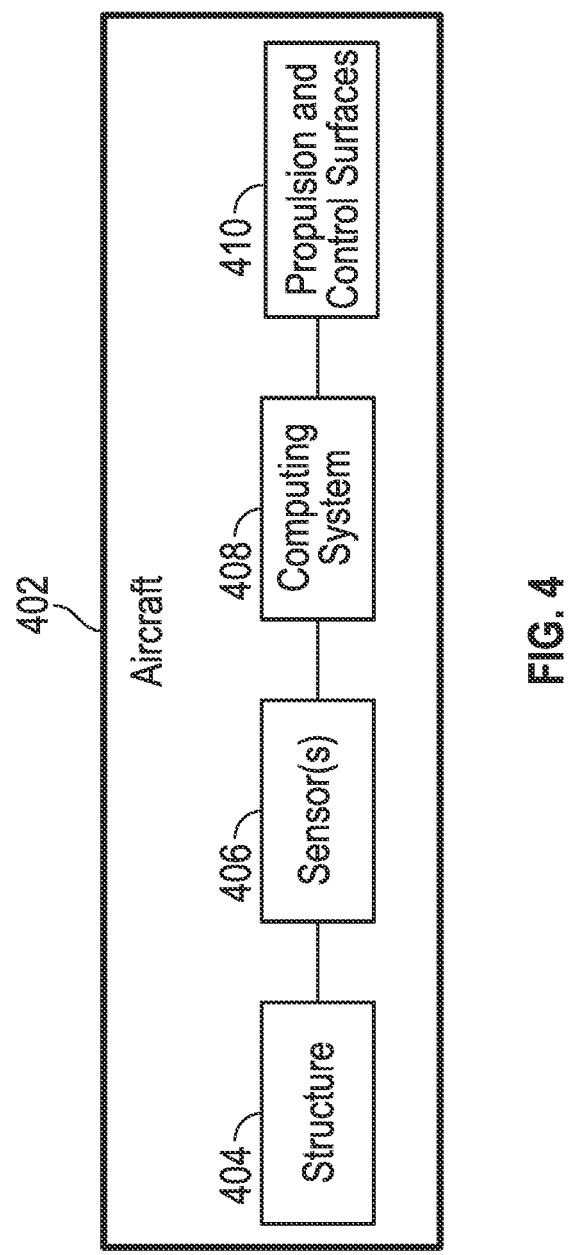
FIG. 4 is a block diagram of an exemplary aircraft in accordance with one or more embodiments.

FIG. 4 illustrates an exemplary block diagram associated with an aircraft 402. The aircraft 402 may correspond to the aircraft 210 of FIG. 2 in some embodiments. As shown in FIG. 4, the aircraft 402 may have a structure 404. The structure 404 may include components or devices associated with operation of the aircraft 402 and the frame (e.g., the chassis or body) of the aircraft. The aircraft 402 may include, or be associated with, one or more sensors 406. The one or more sensors 406 may correspond to the sensors 214 and/or 224 of FIG. 2. The sensor(s) 406 may be configured to monitor the structure 404 for inoperability (e.g., damage or compromise).

Data provided or generated by the sensor(s) 406 may be provided to a computing or processing system 408. The computing system 408 may include one or more components or devices, such as those described above in connection with the computing system 100 of FIG. 1. The computing system 408 may include one or more algorithms to process data received from the sensor(s) 406. The algorithm(s) may adhere to the block diagram 200 of FIG. 2 and/or the flowchart 300 of FIG. 3.

The computing system 408 may be configured to provide one or more outputs based on processing the data from the sensor(s) 406. The outputs provided by the computing system 408 may serve to control or regulate one or more propulsion or control surfaces 410. For example, regulation of the propulsion and control surfaces 410 may be used to compensate for damage or compromise to the structure 404.

Embodiments of this disclosure may be tied to one or more particular machines. For example, one or more computers, devices, or architectures may be configured to compute or determine an operational envelope associated with an aircraft. In some embodiments, a device may be configured to adjust the operational envelope based on a determination that a component of the aircraft structure is damaged or compromised. Such an adjustment may be used to reduce the likelihood that the damage or compromise will propagate or spread through the structure of the aircraft. In some instances, the aircraft may continue to operate despite damage after the envelope is adjusted to achieve safe flight loads. In some instances, when the damage renders the aircraft unsafe for flying, an aircraft currently on the ground may stay on the ground (e.g., "be grounded") until an indication is received that a maintenance activity has been performed. In some embodiments, an aircraft that is inoperable (e.g., damaged or compromised) may be able to fly a reduced mission or with a reduced capability prior to a performance of a service, maintenance, or repair activity.

Illustrative examples described herein relate aspects of this disclosure to aircraft and aerospace environments or applications. Aspects of this disclosure may be applied to other environments or applications. For example, aspects of this disclosure may be adapted so as to be applied to any type or kind of vehicle, such as marine vehicles (e.g., a boat, a ship, a submarine), terrestrial vehicles (e.g., automobiles), etc.

As described herein, in some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

Embodiments may be implemented using one or more technologies. In some embodiments, an apparatus or system may include one or more processors, and memory storing instructions that, when executed by the one or more processors, cause the apparatus or system to perform one or more methodological acts as described herein. Various mechanical components known to those of skill in the art may be used in some embodiments.

Embodiments may be implemented as one or more apparatuses, systems, and/or methods. In some embodiments, instructions may be stored on one or more computer-readable media, such as a transitory and/or non-transitory computer-readable medium. The instructions, when executed, may cause an entity (e.g., an apparatus or system) to perform one or more methodological acts as described herein.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional.

What is claimed is:

1. A method for providing adaptive control to a fly-by-wire rotary wing aircraft, the method comprising:
measuring, via at least one first sensor, at least one of a damage and a compromise associated with a component of the fly-by-wire rotary wing aircraft;
measuring, via at least one second sensor, a state of the fly-by-wire rotary wing aircraft, the at least one second sensor comprising a fly-by-wire sensor;
determining, from the measuring of the at least one first sensor at least one of a region and a location of the at least one of a damage and a compromise and a level of the at least one of a damage and a compromise; and
adapting an operational envelope for the fly-by-wire rotary wing aircraft based on the measured state of the fly-by-wire rotary wing aircraft measured via the at least one second sensor and the determined at least one of a region and a location of the at least one of a damage and a compromise and the level of the at least one of a damage and a compromise,
wherein adapting the operational envelope for the fly-by-wire rotary wing aircraft comprises adjusting one or more operational thresholds via a fly-by-wire control configuration of the fly-by-wire rotary wing aircraft to prohibit a state of operation of the fly-by-wire rotary wing aircraft that exceeds a safe or reliable operation threshold.

2. The method of claim 1, wherein the at least one first sensor is mounted on the fly-by-wire rotary wing aircraft.

3. The method of claim 1, wherein the operational envelope is adapted for the fly-by-wire rotary wing aircraft during a flight.

4. The method of claim 3, further comprising:
indicating that the fly-by-wire rotary wing aircraft should be landed based on the determined at least one of a region and a location of the at least one of a damage and a compromise and the level of the at least one of a damage and a compromise.

5. The method of claim 1, further comprising:
providing an indication of the determined at least one of a region and a location of the at least one of a damage and a compromise and the level of the at least one of a damage and a compromise.

6. The method of claim 1, wherein adapting the operational envelope further comprises reducing a load imposed on the component of the fly-by-wire rotary wing aircraft in order to prevent the at least one of a damage and a compromise from propagating through the fly-by-wire rotary wing aircraft component.

7. The method of claim 1, further comprising, prior to adapting an operational envelope, receiving at least one command based on an actuation of a device by a pilot, wherein adapting the operational envelope for the fly-by-wire rotary wing aircraft is based on the received at least one command based on the actuation of the device by the pilot.

8. An apparatus configured to adaptively control a fly-by-wire rotary wing aircraft, the apparatus comprising:
at least one processor;
at least one first sensor configured to monitor at least one component of the fly-by-wire rotary wing aircraft, the at least one first sensor in communication with the at least one processor;
at least one second sensor configured to monitor a state of the fly-by-wire rotary wing aircraft, the at least one second sensor in communication with the at least one processor, the at least one second sensor comprising a fly-by-wire sensor; and memory in communication with the at least one processor and having instructions stored thereon that, when executed by the at least one processor, cause the apparatus to:

measure at least one of a damage and a compromise associated with the at least one component of the fly-by-wire rotary wing aircraft using the at least one first sensor, determine at least one of a region and a location of the at least one of a damage and a compromise and a level of the at least one of a damage and a compromise, and adapt an operational envelope for the fly-by-wire rotary wing aircraft based on the monitored state of the fly-by-wire rotary wing aircraft measured via the at least one second sensor and the determined at least one of a region and a location of the at least one of a damage and a compromise and the level of the at least one of a damage and a compromise, wherein the adaption comprises adjusting one or more operational thresholds via a fly-by-wire control configuration of the fly-by-wire rotary wing aircraft to prohibit a state of operation of the fly-by-wire rotary wing aircraft that exceeds a safe or reliable operation threshold.

9. The apparatus of claim 8, wherein the instructions, when executed by the at least one processor, cause the apparatus to:

measure the at least one of a damage and a compromise to the fly-by-wire rotary wing aircraft structure during a flight of the fly-by-wire rotary wing aircraft, and adapt the operational envelope for the fly-by-wire rotary wing aircraft during the flight.

10. The apparatus of claim 9, wherein the instructions, when executed by the at least one processor, cause the apparatus to:

provide an indication that the fly-by-wire rotary wing aircraft should be landed based on the determined at least one of a region and a location of the damage and the level of the at least one of a damage and a compromise.

11. The apparatus of claim 8, wherein the instructions, when executed by the at least one processor, cause the apparatus to:

provide an indication of at least one of the determined at least one of a region and a location of the at least one of a damage and a compromise and the level of the at least one of a damage and a compromise.

12. The apparatus of claim 8, wherein the operational envelope is adapted to reduce a load imposed on the at least one component of the fly-by-wire rotary wing aircraft in order to allow for continued safe flight.

13. The apparatus of claim 8, wherein the processor is configured to receive at least one command based on an actuation of a device by a pilot, wherein adapting the operational envelope for the fly-by-wire rotary wing aircraft is based on the received at least one command based on the actuation of the device by the pilot.

* * * * *